US011099400B2

(12) United States Patent
Manger

(10) Patent No.: US 11,099,400 B2
(45) Date of Patent: Aug. 24, 2021

(54) BEAM PROPAGATION CAMERA AND METHOD FOR LIGHT BEAM ANALYSIS

(71) Applicant: Carl Zeiss SMT GmbH, Oberkochen (DE)

(72) Inventor: Matthias Manger, Aalen-Unterkochen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 1187 days.

(21) Appl. No.: 15/225,126

(22) Filed: Aug. 1, 2016

(65) Prior Publication Data

US 2016/0341969 A1 Nov. 24, 2016

Related U.S. Application Data

(63) Continuation of application No. PCT/EP2014/078943, filed on Dec. 22, 2014.

(30) Foreign Application Priority Data

Jan. 31, 2014 (DE) ..................... 10 2014 201 779.3

(51) Int. Cl.
*G02B 27/10* (2006.01)
*G01J 1/42* (2006.01)
(Continued)

(52) U.S. Cl.
CPC ............ *G02B 27/10* (2013.01); *B23K 26/705* (2015.10); *G01J 1/0407* (2013.01); *G01J 1/0411* (2013.01);
(Continued)

(58) Field of Classification Search
CPC .... G02B 27/10; G02B 5/1814; G02B 27/106; G02B 27/58; H05G 2/008; B23K 26/705; G01J 1/0407; G01J 1/0411; G01J 1/4257
See application file for complete search history.

(56) References Cited

U.S. PATENT DOCUMENTS 5,329,350 A 7/1994 Wright et al.
8,237,922 B2 8/2012 Scaggs
(Continued)

FOREIGN PATENT DOCUMENTS

DE 19935630 C2 8/2003
DE 102012212354 A1 1/2014
(Continued)

OTHER PUBLICATIONS

Office Action in corresponding German Application No. 10 2014 201 779.3, dated Dec. 3, 2014, along with an English translation.
(Continued)

*Primary Examiner* — Georgia Y Epps
*Assistant Examiner* — Don J Williams
(74) *Attorney, Agent, or Firm* — Edell, Shapiro & Finnan, LLC

(57) ABSTRACT

A beam propagation camera has at least one beam-splitting optical arrangement (240) configured to split a beam, which is incident on the beam-splitting optical arrangement along an optical axis (OA) of the beam propagation camera, into a multiplicity of sub-beams, and a sensor arrangement (250) configured to detect the sub-beams. The beam-splitting optical arrangement has a diffractive structure (241) configured such that at least two of the sub-beams are spatially separated from one another on the sensor arrangement and have respective foci longitudinally offset from one another along the optical axis.

20 Claims, 8 Drawing Sheets

(51) Int. Cl.

| | |
|---|---|
| ***B23K 26/70*** | (2014.01) |
| ***G01J 1/04*** | (2006.01) |
| ***G02B 5/18*** | (2006.01) |
| ***G02B 27/58*** | (2006.01) |
| ***H05G 2/00*** | (2006.01) |
| *G01J 3/18* | (2006.01) |

(52) U.S. Cl.
CPC .......... *G01J 1/4257* (2013.01); *G02B 5/1814* (2013.01); *G02B 27/106* (2013.01); *G02B 27/58* (2013.01); *H05G 2/008* (2013.01); *G01J 3/189* (2013.01)

(56) References Cited

U.S. PATENT DOCUMENTS

| | | | | |
|---|---|---|---|---|
| 2004/0196516 | A1* | 10/2004 | Petersen | B29C 35/0888 359/15 |
| 2006/0268669 | A1 | 11/2006 | Kaji | |
| 2008/0309771 | A1* | 12/2008 | Takahashi | G02B 7/34 348/208.4 |
| 2009/0046298 | A1* | 2/2009 | Betzig | G01N 21/6445 356/521 |
| 2009/0185132 | A1 | 7/2009 | Raymond | |

FOREIGN PATENT DOCUMENTS

| | | | |
|---|---|---|---|
| JP | 200679785 | A | 3/2006 |
| JP | 2006338754 | A | 12/2006 |
| JP | 2013527979 | A | 7/2013 |

OTHER PUBLICATIONS

Wyant, J., "Basic wavefront aberration theory for optical metrology", Applied Optics and Optical Engineering, vol. xi, 1992.

International Preliminary Report on Patentability in counterpart International Application No. PCT/EP2014/078943, dated Aug. 2, 2016.

English Translation of Japanese Office Action, JP Application No. 2016-549399, Drafting date: Nov. 12, 2018, 3 pages.

Japanese Office Action, Jp Application No. 2016-549399, dated Nov. 12, 2018, 5 pages.

International Search Report and Written Opinion in counterpart International Application No. PCT/EP2014/078943, dated Jun. 10, 2015.

European Office Action with English translation, Application No. 14 825 334.7, dated Oct. 22, 2019, 13 pages.

* cited by examiner

BEAM PROPAGATION CAMERA AND METHOD FOR LIGHT BEAM ANALYSIS

CROSS REFERENCE TO RELATED APPLICATIONS

This is a Continuation of International Application PCT/EP2014/078943, which has an international filing date of Dec. 22, 2014, and the disclosure of which is incorporated in its entirety into the present Continuation by reference. The following disclosure is also based on and claims the benefit of and priority under 35 U.S.C. § 119(a) to German Patent Application No. DE 10 2014 201 779.3, filed Jan. 31, 2014, which is also incorporated in its entirety into the present Continuation by reference.

FIELD OF THE INVENTION

The invention relates to a beam propagation camera and a method for light beam analysis. In particular, the invention is employable as a beam propagation measurement system for laser radiation in order to analyze a light beam (in particular a laser beam) in terms of the focusing properties thereof and in order to obtain information about both the geometric beam parameters and the beam quality.

In particular, the invention is suitable for analyzing electromagnetic radiation, as is used in e.g. laser plasma sources (for example in the case of an EUV (extreme ultraviolet) source of a microlithographic projection exposure apparatus), but it is not restricted thereto. In further applications, the beam propagation camera according to the invention is also suitable, in very general terms, to analyze electromagnetic radiation which is used for any desired purpose (for measurement purposes in particular).

BACKGROUND

By way of example, laser plasma sources are used for applications in lithography. Thus, for example, the required EUV light is generated by an EUV light source based on a plasma excitation, in respect of which FIG. 6 shows an exemplary conventional setup, during the operation of a projection exposure apparatus configured for the EUV range (e.g. at wavelengths of e.g. approximately 13 nm or approximately 7 nm).

Initially, this EUV light source has a high-energy laser (not shown here), e.g. for generating infrared radiation 706 (e.g. $CO_2$ laser with a wavelength of $\lambda \approx 10.6$ µn), said infrared radiation being focused by way of a focusing optical unit, passing through an opening 711 present in a collector mirror 710 embodied as an ellipsoid and being guided onto a target material 732 (e.g. tin droplets) which is generated by a target source 735 and supplied to a plasma ignition position 730. The infrared radiation 706 heats the target material 732 situated in the plasma ignition position 730 in such a way that said target material transitions into a plasma state and emits EUV radiation. This EUV radiation is focused by way of the collector mirror 710 onto an intermediate focus IF and enters through the latter into a downstream illumination device, the edge 740 of which is merely indicated and which has a free opening 741 for the light entrance.

What is of substantial importance for the dose stability or time stability of the EUV emission characteristic achievable in an EUV light source or laser plasma source and for the realizable EUV light yield is that the tin droplets "flying into" the laser plasma source very quickly (e.g. with an injection rate in the region of 100 kHz or with a time interval of e.g. 10 µs) with increasing light requirements are hit individually in a highly precise (e.g. with an accuracy of more than 1 µm) and reproducible manner by the laser beam atomizing the droplet. In the aforementioned setup, this in turn requires highly accurate setting of the droplet position and highly accurate updating of the infrared radiation 706 generated by e.g. the $CO_2$ laser.

Both the droplet position and the focal position of the laser beams to be updated accordingly can be determined using a so-called beam propagation camera, wherein both the laser beams in the "forward direction" (i.e. the infrared radiation 706 prior to incidence on the respective target droplets) and the laser beams in the "backward direction" (i.e. the infrared radiation 706 reflected back by the respective target droplet) are detected and the measurement data required for the laser beam guidance and droplet guidance are obtained.

A problem occurring here in practice is that, inter alia, the infrared radiation 706 reflected back from the target droplets has a comparatively weak intensity and this makes an exact metro-logical detection of the droplet position, and hence also the highly accurate updating of the infrared radiation 706 generated by the $CO_2$ laser, more difficult.

With regard to the prior art, reference is made by way of example to U.S. Pat. No. 8,237,922 B2 and U.S. Pat. No. 5,329,350.

SUMMARY

It is an object of the present invention to provide a beam propagation camera and a method for light beam analysis, which enable an analysis that is as exact as possible, even under conditions with a comparatively weak intensity.

This object is achieved by the beam propagation camera in accordance with the features of independent patent claim 1 and the method in accordance with the features of coordinate patent claim 20.

A beam propagation camera according to the invention has:

- a beam-splitting optical arrangement, which brings about beam-splitting of a beam, which is incident during operation on the beam-splitting optical arrangement, into a multiplicity of sub-beams; and
- a sensor arrangement for detecting these sub-beams;
- wherein the beam-splitting optical arrangement has a diffractive structure; and
- wherein this diffractive structure is configured in such a way that at least two of the sub-beams are spatially separated from one another on the sensor arrangement and have a focus offset in the longitudinal direction in relation to the optical axis.

Within the scope of the present application, a beam propagation camera is understood to mean a measurement arrangement for light beam analysis, which serves to measure the far-field properties or focusing properties and the focus position of a light beam (in particular a laser beam) in order to obtain information about both the geometric beam parameters and the beam quality. Here, the size of the focus constitutes a measure for the beam quality and the position of the focus on the sensor arrangement determines the geometric properties of the beam.

Within the scope of the present application, splitting a beam into sub-beams should be understood to mean that these sub-beams each constitute a copy of the original split beam to the extent that the sub-beams in each case have the same geometric parameters as the original beam, with only the intensity of the sub-beams being correspondingly reduced in relation to the intensity of the original beam as a result of the split into a plurality of sub-beams.

The optical axis can be, in particular, an axis of symmetry of the system or of the beam propagation camera.

Within the meaning of the present application, the criterion that at least two of the sub-beams are spatially separated from one another on the sensor arrangement should preferably be understood to mean that the distance between the (intensity-weighted) centroids of the relevant spots of the sub-beams generated on the sensor arrangement is at least 5 times, in particular at least 10 times, the spot dimension within the meaning of the second (statistical) moment. In the case of beams with a hard cutoff (e.g. top hat beams), the definition of the moment should be ensured by suitable apodization, as will still be explained in more detail below.

The invention initially proceeds from the approach of achieving a beam splitting of a light beam (e.g. a decoupled sample beam) of electromagnetic radiation to be analyzed, which in turn enables a detection of the sub-beams generated thus and the evaluation thereof for analyzing the beam properties, by virtue of the sub-beams both having a longitudinal focus offset and being laterally offset (to enable a simultaneous recording at the location of the sensor arrangement). Proceeding from this approach, the invention is now furthermore based on the concept of, by using a diffractive structure, obtaining the plurality of focal positions which are generated by such a diffractive structure and which correspond to the different orders of diffraction of the diffractive structure in order to realize the longitudinal focus offset. In other the words, the invention makes use in a targeted manner of the usually unwanted property of a diffractive lens element of generating mutually different focal positions in accordance with the different orders of diffraction in order to realize a longitudinal focus offset required for beam analysis.

At the same time, the invention makes use of the further circumstance that the lateral offset of the sub-beams required beyond the aforementioned longitudinal focus offset for enabling simultaneous recording at the location of the sensor arrangement is achievable in a comparatively simple manner by way of a “break in symmetry” which, for example, can be obtained by a simple decentration of the diffractive structure (either by displacement in a plane perpendicular to the optical axis or already by an appropriate design of the diffractive structure).

Here, according to the invention, an increased design complexity in the configuration of the beam-splitting optical arrangement is accepted, said increased design complexity being caused by the—as a matter of principle—nontrivial focus behavior of a diffractive structure and the circumstance that the sub-beams corresponding to the individual orders of diffraction have mutually different magnifications and also a different “afocality mismatch” (to the extent that the linking of Fourier planes and field planes in the optical beam path is only given for the 0th order of diffraction).

By accepting this design complexity, significant advantages are obtained in return—as will be explained in more detail below—, wherein, in particular, the large freedom or flexibility in the design of the beam propagation camera, the option of realization, even in applications with comparatively weak light, and the low optomechanical complexity of the beam-splitting optical arrangement (which places no particular requirements on the holder, adjustment mechanisms, etc.) obtained in the concept according to the invention should be mentioned.

As a result, a light beam e.g. decoupled from electromagnetic radiation to be analyzed is replicated in the beam propagation camera according to the invention in a plurality of sub-beams or used beams in a suitable manner and using a diffractive structure, wherein adjacent used beams in the propagation direction have a focus offset in the direction longitudinal to the direction of propagation and a separation in the direction transverse to the optical axis (or light propagation direction of the radiation incident on the beam-splitting arrangement) in such a way that the amplitudes of the sub-beams do not overlap in any appreciable manner, and so a plurality of beam sections or measurement spots can be recorded simultaneously using a sensor arrangement with a suitable extent.

In accordance with one embodiment, the diffractive structure has a decentered arrangement in relation to the optical axis.

In accordance with one embodiment, the beam-splitting optical arrangement additionally has a refractive optical element.

In accordance with one embodiment, the diffractive structure has a focal length $f_1$ and the refractive optical element has a focal length $f_0$, wherein the ratio $f_1/f_0$ is at least 2, in particular at least 4, more particularly at least 10.

In accordance with one embodiment, the refractive optical element and the diffractive structure have a monolithic configuration.

In accordance with one embodiment, the refractive lens element is a plano-convex lens element.

In accordance with one embodiment, the refractive optical element is arranged in such a way that a focal plane of this refractive optical element corresponds to a pupil plane in the optical beam path.

In accordance with one embodiment, the diffractive structure is configured as a phase DOE.

In accordance with one embodiment, the diffractive structure can also be configured as a transmission DOE. In this manner, a targeted attenuation of the intensity can also be brought about in the case of applications with strong light.

In accordance with one embodiment, the diffractive structure is configured as a Fresnel lens element or as a Fresnel zone plate.

In accordance with one embodiment, the diffractive structure has an increasing diffraction efficiency with an increasing order of diffraction.

In accordance with one embodiment, a decrease in intensity accompanying an increasing defocusing of the sub-beams generated by the beam splitting of the (original) beam on the sensor arrangement is at least partly compensated for as a consequence of this diffraction efficiency which increases with increasing order of diffraction.

In accordance with one embodiment, the diffractive structure is operated in transmission.

In accordance with one embodiment, the diffractive structure is operated in reflection.

In accordance with one embodiment, the beam propagation camera has a first analysis unit for beam analysis prior to reflection at an object and a second analysis unit for beam analysis after reflection at an object.

In accordance with one embodiment, the object is a flying object, in particular a metallic target droplet in a laser plasma source.

In accordance with one embodiment, the beam propagation camera furthermore comprises an apodization filter.

In accordance with one embodiment, this apodization filter is realized in the sensor arrangement.

In accordance with one embodiment, this apodization filter is realized as a gray filter arranged in a pupil plane in the optical beam path.

The invention furthermore also relates to a method for light beam analysis, comprising:

- beam-splitting a beam propagating along an optical axis into a multiplicity of sub-beams;
- measuring the spot size generated in each case by these sub-beams on a sensor arrangement; and
- calculating at least one of the divergence (θ), focal position ($z_0$) and waist size ($w_0$) beam parameters from the measured spot sizes,
- wherein the beam splitting is carried out using a diffractive structure so that at least two of the sub-beams are spatially separated from one another on the sensor arrangement and have a focus offset in the longitudinal direction in relation to the optical axis.

The method according to the invention can be carried out, in particular, using a beam propagation camera, which has the features described above.

Further configurations of the invention can be gathered from the description and the dependent claims.

The invention is explained in greater detail below on the basis of exemplary embodiments illustrated in the accompanying figures.

DETAILED DESCRIPTION

Figure 1:
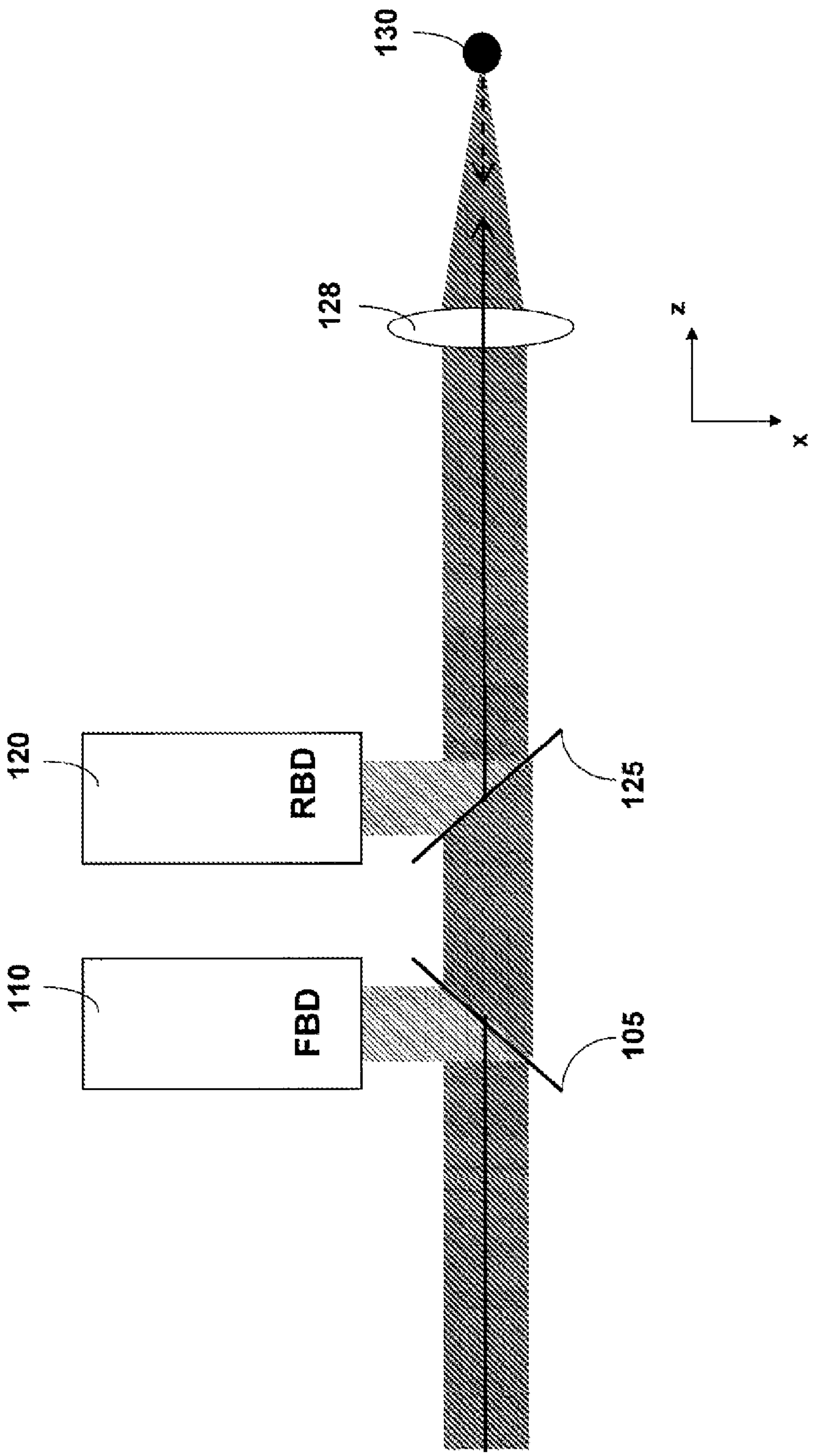
FIG. 1 shows a schematic illustration for explaining a basic design possible both for realizing a droplet position determination and for determining the focal position of the laser beams, to be updated accordingly, in a laser plasma source.
Figure 6:
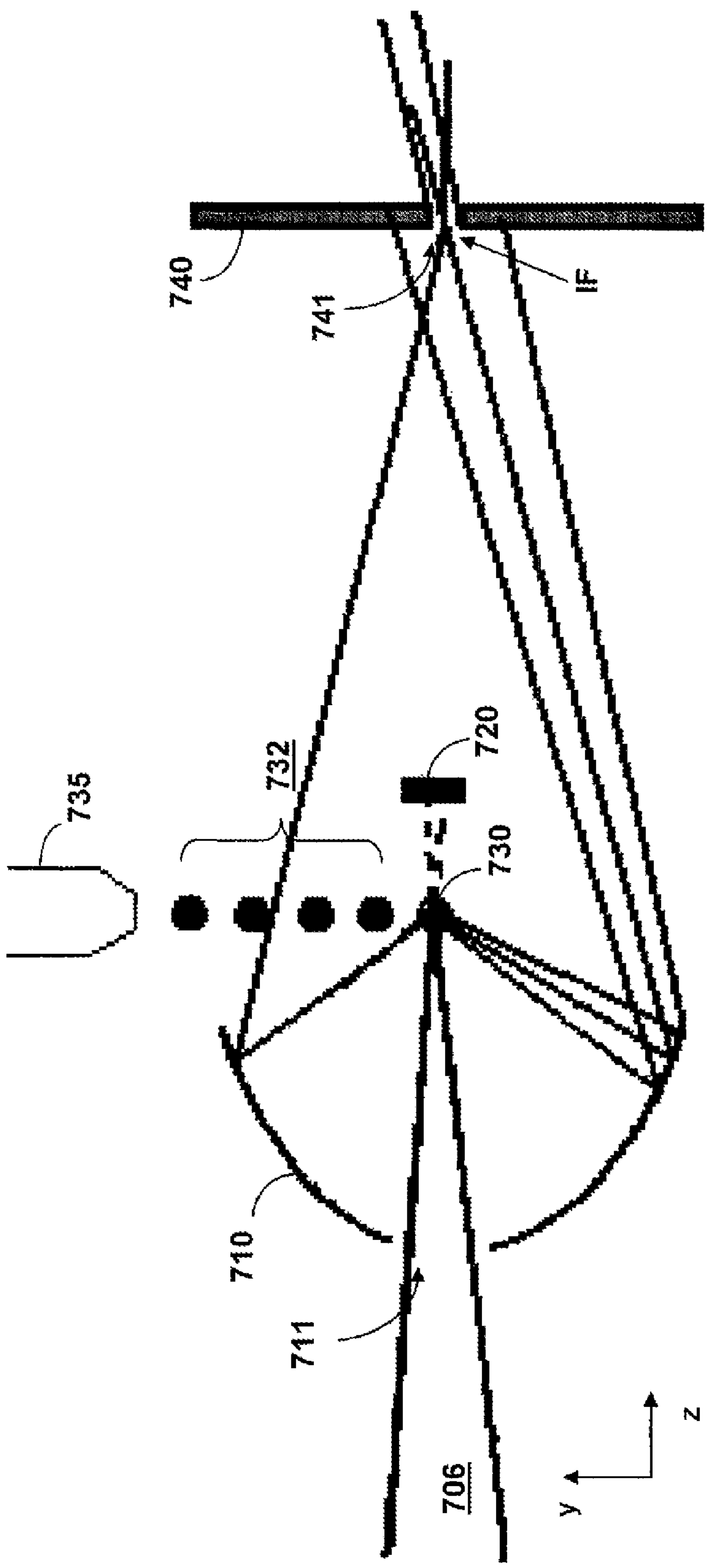
FIG. 6 shows a schematic illustration of the design of an EUV light source in accordance with the prior art.

FIG. 1 shows a schematic illustration of a basic design possible in a laser plasma source (such as e.g. the one in FIG. 6), both for determining the droplet position and the focal position of the laser beams to be updated accordingly, wherein both laser beams in the "forward direction" (prior to incidence on the respective target droplet) and laser beams in the "backward direction" (i.e. the inferred radiation reflected back from the respective target droplet) are evaluated.

In accordance with FIG. 1, some of the incident laser beam with a Gaussian profile is decoupled at a first partly transmissive mirror 105 and analyzed by a first analysis unit 110. The part of the incident laser beam passing through the partly transmissive mirror 105 and a further partly transmissive mirror 125 reaches a metallic target droplet 130 (e.g. a tin droplet) by way of a focusing optical unit 128, with some of the laser beam being reflected back at said target droplet and returning to the partly transmissive mirror 125 collimated via the focusing optical unit 128. At the partly transmissive mirror 125, some of the laser beam is decoupled in turn to a second analysis unit 120. Moreover, beam traps (not plotted in FIG. 1) for capturing the respectively unused portion of the radiation incident on the partly transmissive mirror 105 or 125 may be provided.

Figure 4A:
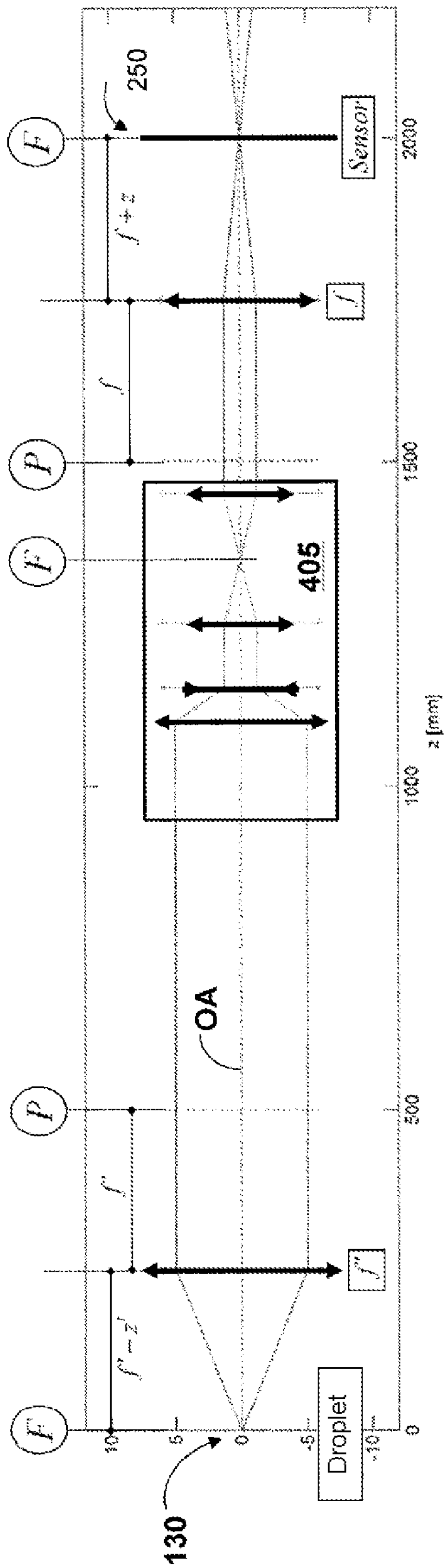
FIGS. 4A-4B show schematic illustrations for explaining an exemplary (measurement) beam path in a beam propagation camera according to the invention.

A schematic beam path for analyzing the laser beam in the "backward direction" is depicted in FIG. 4A, with the field planes being denoted by "F" and the pupil planes being denoted by "P" in each case. "130" denotes the metallic target droplet in FIG. 4A, "405" is an afocal telescope group and "250" denotes the sensor arrangement. A shift in the position of the target droplet 130 has as a consequence a change in the image obtained on the sensor arrangement 250.

Thus, the analysis of the laser beams both in the "forward direction" (laser beam prior to incidence on the respective target droplet 130, denoted as "forward beam" below) and in the "backward direction" (laser beam after the reflection at the respective target droplet 130, denoted as "backward beam" below) allows a statement to be made about the relative setting of the laser beam and target droplet 130 in relation to one another, wherein—with reference again being made to FIG. 1—the setting or focal position of the laser beam can be deduced from the result obtained with the first analysis unit 110 and the droplet position can be deduced from the result obtained with the second analysis unit 120.

In principle, depending on the case, different conventions are possible and conventional for the beam dimension measure and the divergence measure. In the field of laser technology for example, the moments $$w_x^2(z) = \frac{\int_{-\infty}^{+\infty} dxdyI(x, y; z)(x - \overline{x}(z))^2}{\int_{-\infty}^{+\infty} dxdyI(x, y; z)}, \tag{1}$$

$$w_y^2(z) = \frac{\int_{-\infty}^{+\infty} dxdyI(x, y; z)(y - \overline{y}(z))^2}{\int_{-\infty}^{+\infty} dxdyI(x, y; z)}$$

with $$\overline{x}(z) = \frac{\int_{-\infty}^{+\infty} dxdyI(x, y; z)x}{\int_{-\infty}^{+\infty} dxdyI(x, y; z)}, \quad \overline{y}(z) = \frac{\int_{-\infty}^{+\infty} dxdyI(x, y; z)y}{\int_{-\infty}^{+\infty} dxdyI(x, y; z)} \tag{2}$$

often serve as a basis of a beam dimension definition in accordance with $$w(z)=\sqrt{w_x^2(z)+w_y^2(z)} \tag{3}$$

or $$w(z) = \sqrt[4]{w_x^2(z)w_y^2(z)} \tag{4}$$

Here, I(x, y; z) denotes the light intensity for the selected sectional plane.

If a Gaussian beam is based on a diameter of 5*σ(wherein σ denotes the standard deviation or width of the normal distribution in accordance with the conventional terminology and emerges from the second moment), the distance of the relevant spot on the sensor arrangement preferably has a value of at least 5*σ.

When analyzing the forward beam and the backward beam in the basic setup of FIG. 1, it should be noted that only the forward beam should be considered in an idealized manner as a "Gaussian beam", for which, in the region of the image-side focus, the following applies to a good approximation for the beam dimension w as a function of the propagation coordinate z $$w(z)=\sqrt{w_0^2+\theta^2(z-z_0)^2} \tag{5}$$

where $w_0$ denotes the waist size, θ denotes the divergence and $z_0$ denotes the waist position (focal position).

Below, problems are initially discussed, which, for example in the case of analyzing the backward beam in the second analysis unit 120, emerge from the fact that the beam to be examined is not an ideal Gaussian beam but rather a comparatively sharply cut off beam (also referred to as "top hat" beam below). In the case of such a sharply cutoff beam, an Airy light distribution emerges in the focus (far field) and in the aberration-free ideal case:

$$I\left(r=\sqrt{x^2+y^2},\ z=z_0\right)=\pi P\left(\frac{1}{L_c}\right)^2\left[\frac{2J_1\left(2\pi\frac{r}{L_c}\right)}{2\pi\frac{r}{L_c}}\right]^2 \tag{6}$$

where $L_c=\frac{\lambda}{NA}$ denotes the characteristic length, P denotes the entire power transmitted through the system and $J_1(x)$ denotes the first order Bessel function. However, the moments in accordance with equation (5) are not defined due to the asymptotic decrease $$I(r,z=z_0)\propto\frac{1}{r^2}$$

in this light distribution. The problem of also evaluating the backward beam with a "hard cutoff" resulting herefrom can be overcome by a suitable "artificial" apodization: In a first embodiment, this can be carried out by virtue of a suitable mask being realized "electronically" in the plane of the sensor arrangement, said mask apodizing the intensity curves in accordance with the replacement $$I(x,y;z)\rightarrow I(x,y;z)A(x-\bar{x},y-\bar{y}) \tag{7}$$

by a suitably selected apodization function (wherein this apodization can be denoted "soft" to the extent that discontinuities only occur in the higher derivatives of the apodization curve). By way of example, the function $$A_R(x,y)=\frac{1}{2}\left(1+\cos\left(\pi\frac{\sqrt{x^2+y^2}}{R}\right)\right) \tag{8}$$

with the cutoff radius R in the range $5L_c<R<10L_c$, which is only discontinuous from the second derivatives, is suitable to this end.

In a second embodiment, an apodization (which is "soft" within the above meaning)

$$u(x,y;z_{NF})\theta(x^2+y^2\leq R_{NA})\rightarrow u(x,y;z_{NF})A_{R_{NA}}(x,y) \tag{9}$$

can be realized by introducing a structured gray filter with a corresponding profile into the near field or into a pupil plane. Here, u(x,y;z) denotes the beam amplitude (which determines the intensity by way of $I(x,y;z)=|u(x,y;z)|^2$) and $R_{NA}$ denotes the aperture radius (defining the opening or numerical aperture NA).

Figure 3:
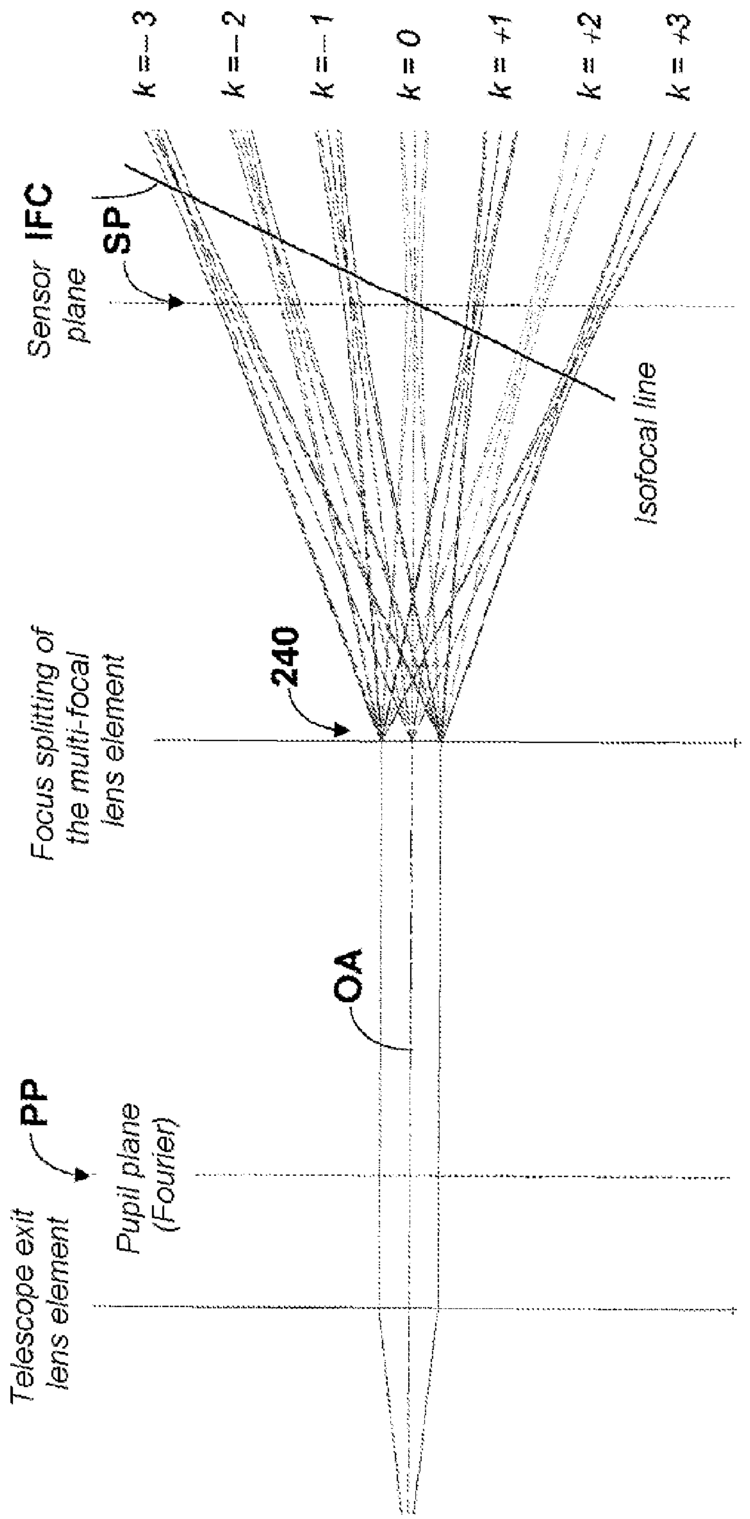
FIG. 3 shows a schematic illustration for explaining the principle of beam fanning, which takes place in accordance with the present invention.

FIG. 3 shows a schematic illustration for explaining the principle of the beam fanning, which takes place in accordance with the invention.

Here, a light beam (e.g. a sample beam decoupled from electromagnetic radiation to be analyzed) is split or replicated in various sub-beams or used beams, wherein, firstly, a longitudinal focus offset in the propagation direction and, secondly, transversal splitting (for enabling a simultaneous evaluation in a sensor arrangement) are obtained for these used beams. As can be seen from the isofocal line (denoted by IFC) sketched out in FIG. 3, the focus is different for each one of the individual sub-beams. The sensor arrangement 250 placed into the beam path results in different spot images, wherein the size is smallest in the middle or at the perfect focus and increases to the edge. An analysis of the image recorded by the sensor arrangement, in which the size of the spot image is established as a function of the index (e.g. from −3 to 3), therefore enables the determination of the focal position.

A beam-splitting optical arrangement 240 explained in more detail below serves to realize both the longitudinal focal offset and the transverse splitting of the sub-beams.

Figure 2B:
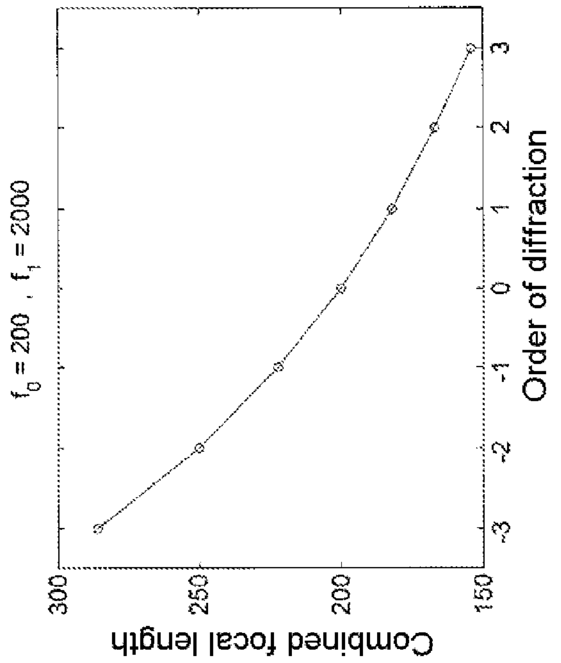
FIGS. 2A-2C show schematic illustrations for explaining the design and the mode of operation of a beam-splitting optical arrangement employed within the scope of the present invention.
Figure 2A:
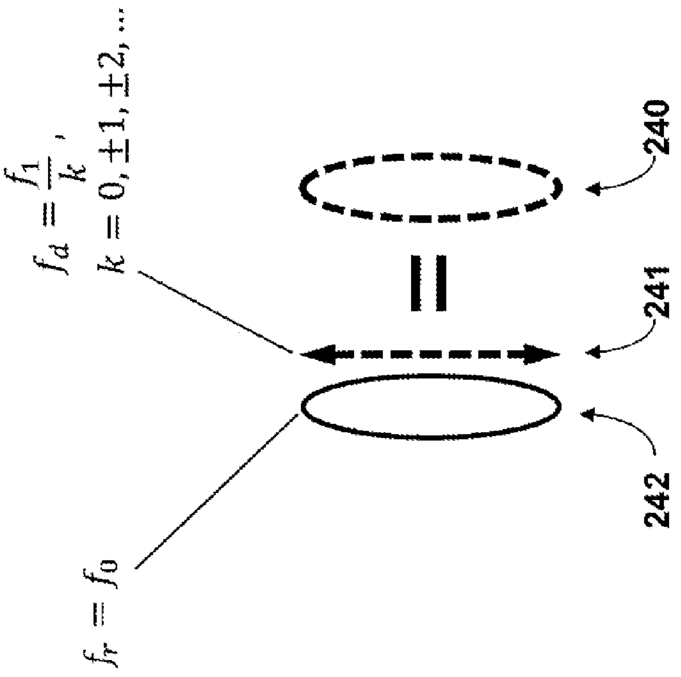

In the exemplary embodiment, the beam-splitting optical arrangement 240 has a diffractive structure 241 and a refractive optical element (refractive lens element) 242, which have a monolithic embodiment here and together form a multi-focal optical element, as indicated schematically in FIG. 2A.

In a specific exemplary embodiment, the refractive optical element 242 can be a plano-convex lens element, wherein the diffractive structure 241 can be formed on the plane surface of this plano-convex lens element. In a further embodiment, the refractive optical element 242 (e.g. plano-convex lens element) can also be attached to a separate diffractive optical element (DOE) by way of an index-matched lacquer. In accordance with these refinements, an element with a low optomechanical complexity (in respect of holder, adjustment mechanism etc.) is realized in each case, by which the beam-spitting according to the invention can be obtained.

However, the invention is not restricted to the integration of diffractive structure and refractive optical element or, in particular, to the described monolithic refinement. Hence, diffractive structure and refractive optical element or lens element can also have a separate configuration and a (preferably small) distance from one another in further embodiments.

A sensor arrangement 250 is situated in the pupil plane (Fourier plane) of the optical beam path, and the focal plane of the refractive optical element 242 is likewise situated in a pupil plane (Fourier plane) of the beam path.

In principle, in accordance with the occurring orders of diffraction, a diffractive lens element has positive and negative focal lengths in accordance with $$f_{diff}=\frac{f_1}{k},\quad k=0,\pm1,\pm2,\cdots \tag{10}$$

Here, $f_1$ denotes the focal length of the first positive order of diffraction and k denotes the beam index or the order of diffraction. Here, the intensity of the respective focus depends directly on the embodiment and approximation form of the underlying (approximately parabolic) phase profile. In combination with a refractive lens element with a focal length of $f_0$, a multi-focal optical system emerges with a plurality of used focal lengths $f_k$, $k=0,\pm 1, \ldots, k_{max}$, wherein the following applies approximately if the distance between the diffractive structure and the refractive lens element is neglected:

$$f_k \approx \frac{f_0 f_1}{f_1 + k\ f_0} \tag{11}$$

This relation is elucidated in FIG. 2B for $f_1 \gg f_0$.

Figure 2C:
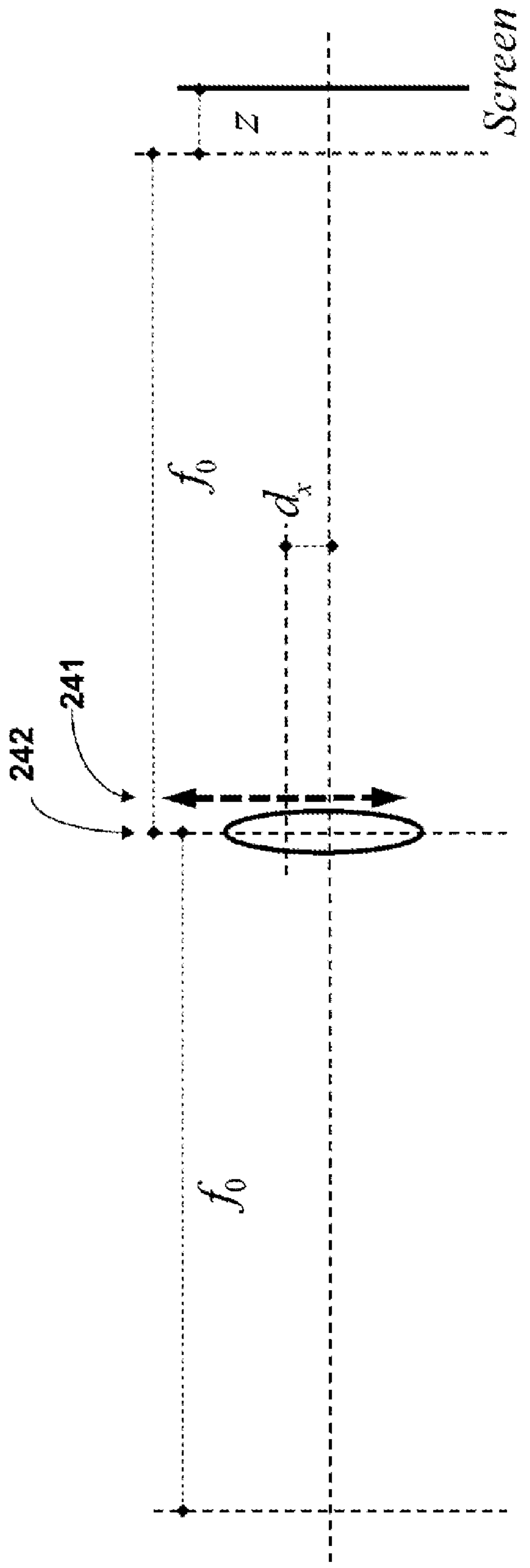
Figure 4B:
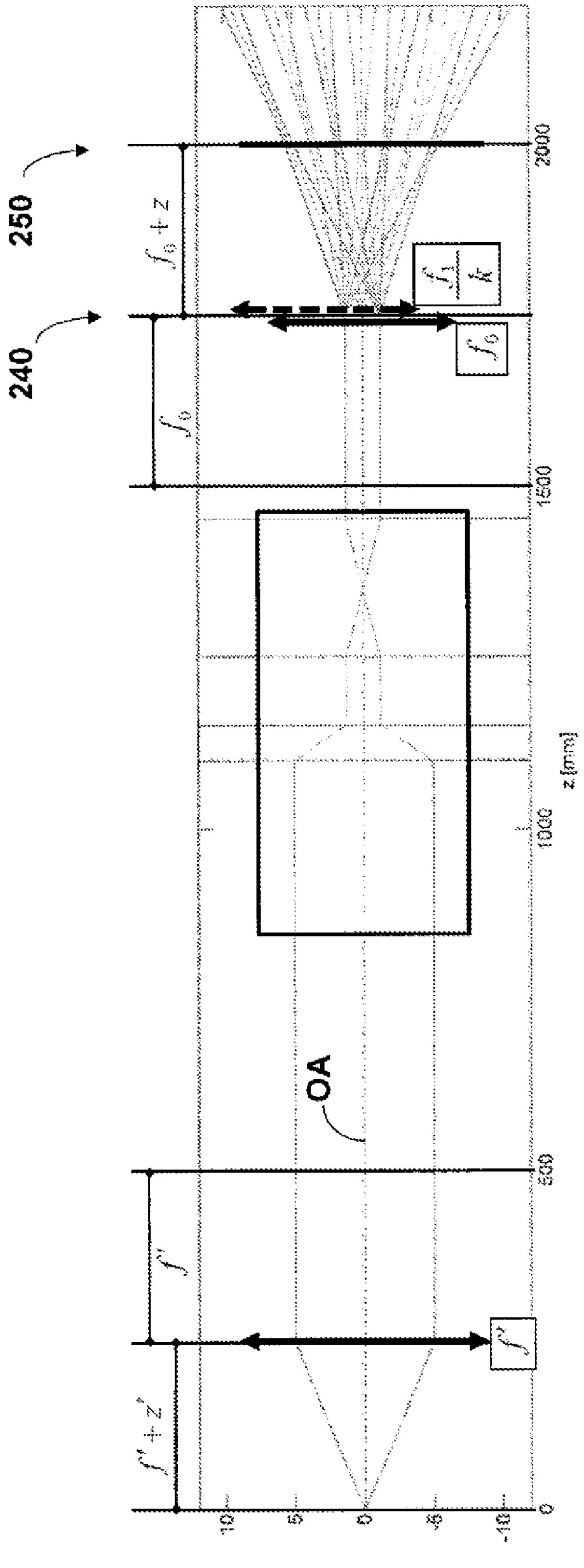

As indicated in FIG. 4B, a lateral split emerges as a consequence of a break in symmetry, which is introduced in a targeted manner, or of a decentration of the beam-splitting optical arrangement 240. This decentration is depicted schematically in FIG. 2C and it is achieved in the exemplary embodiment by virtue of the refractive optical element 242 being arranged symmetrically with respect to the optical axis OA and the diffractive lens element 241 being arranged decentered by a path $d_x$ or displaced perpendicular to the optical axis OA.

Below, the evaluation of the measured beam sizes for establishing the sought-after beam parameters (divergence θ, focal position $z_0$ and waist size $w_0$) is explained. Even though both the longitudinal focal offset obtained by the diffractive structure according to the invention and the lateral offset of the sub-beams caused by the break in symmetry are to be taken into account here, these are initially ignored—merely for the purposes of a better understanding—below, i.e. an evaluation in the case of a conventional beam analysis without the longitudinal focal offset according to the invention and without the lateral offset of the sub-beams is described first.

When evaluating a conventional beam analysis without the longitudinal focal offset according to the invention and without the lateral offset of the sub-beams, the measured beam dimensions w(z) can initially be squared, whereupon the beam data in the focus can be established by way of a fit on the basis of the equation $$w^2(z)=A+Bz+Cz^2 \tag{12}$$

(i.e. a second order polynomial describing a parabola) by virtue of the parameters or "fitting coefficients" A, B and C being determined in accordance with equation (12). According to equation (5), the following relation exists between the fitting coefficients and the beam parameters:

$$A=w_0^2+\theta^2 z_0^2, B=-2\theta^2 z_0, C=\theta^2 \tag{13}$$

Hence, the sought-after beam parameters (divergence θ, focal position $z_0$ and waist size $w_0$) emerge in a simple manner from the fitting coefficients in accordance with $$\theta = \sqrt{C},\ z_0 = -\frac{B}{2C},\ w_0 = \sqrt{A - \frac{B^2}{4C}} \tag{14}$$

According to the rules of the Fourier representation, the waist size $w_0$ and divergence θ are coupled by way of the relation $$w_0\theta=c \tag{15}$$

where c denotes a constant, which depends on the beam properties and the selected conventions for the beam dimension and diversions measure. The following applies for an ideal Gaussian fundamental mode and the moment-based beam measures:

$$c = \frac{\lambda}{\pi} \tag{16}$$

where λ denotes the light wavelength. By contrast, the modified form $$c = M^2\frac{\lambda}{\pi} \tag{17}$$

applies for an aberrated Gaussian beam, with the propagation-invariant beam parameter product $M^2 \geq 1$ as fundamental quality measure. By comparing the variable $w_0\theta$ from equation (15) with the variable $\lambda/\pi$ from the equation (16), it is therefore possible to determine how closely the analyzed beam corresponds to an ideal Gaussian beam or whether it is, for example, a comparatively strongly aberrating beam.

According to the explanation above of the evaluation in the case of a conventional beam analysis, which was merely provided for introductory purposes and for improved understandability, the following describes how this evaluation can be undertaken for the beam analysis according to the invention, i.e., in particular, taking into account the longitudinal focal offset and the lateral offset of the sub-beams obtained by the break in symmetry.

The effect of the break in symmetry can be described in the paraxial beam transfer matrix formalism, by virtue of the conversion being made to homogeneous coordinates when describing the beam in accordance with $$\underline{ray} = \begin{pmatrix} x \\ u \\ l \end{pmatrix},\ \underline{ray'} = \begin{pmatrix} x' \\ u' \\ l \end{pmatrix} \tag{18}$$

where the variables with apostrophes (x', u') represent the object space and the variables without apostrophes (x, u) represent the image space. The additional third dimension (with a "one entry") renders it possible likewise to represent translations and tilts in the form of transfer matrices in the extended formalism.

The Fourier representation proceeding from the object-side focal plane of the refractive lens element is conveyed by the transfer matrix $$\underline{M}(k) = \underbrace{\begin{pmatrix} 1 & f_0+z & 0 \\ 0 & 1 & 0 \\ 0 & 0 & 1 \end{pmatrix}}_{\text{Propagation from the lens element to the screen}} \tag{19}$$

-continued $$\underbrace{\underbrace{\begin{pmatrix} 1 & 0 & -d_x \\ 0 & 1 & 0 \\ 0 & 0 & 1 \end{pmatrix}\begin{pmatrix} 1 & 0 & 0 \\ -\frac{k}{f_1} & 1 & 0 \\ 0 & 0 & 1 \end{pmatrix}\begin{pmatrix} 1 & 0 & d_x \\ 0 & 1 & 0 \\ 0 & 0 & 1 \end{pmatrix}}_{\text{Decentered diffractive lens element}}\underbrace{\begin{pmatrix} 1 & 0 & 0 \\ -\frac{1}{f_0} & 1 & 0 \\ 0 & 0 & 1 \end{pmatrix}}_{\text{Refractive lens element}}}_{\text{Effective focus-splitting of the multi-focus lens element}}$$

$$\underbrace{\begin{pmatrix} 1 & f_0 & 0 \\ 0 & 1 & 0 \\ 0 & 0 & 1 \end{pmatrix}}_{\text{Propagation from the Fourier plane to the lens element}} =$$

$$\begin{pmatrix} -z\left(\frac{1}{f_0}+\frac{k}{f_1}\right)-k\frac{f_0}{f_1} & f_0-\frac{f_0}{f_1}k(z+f_0) & -\frac{d_x}{f_1}k(z+f_0) \\ -\left(\frac{1}{f_0}+\frac{k}{f_1}\right) & -\frac{f_0}{f_1}k & -\frac{d_x}{f_1}k \\ 0 & 0 & 1 \end{pmatrix}$$

in the extended formalism. The following desired transverse beam splittings can be read off in a simple manner from the matrix elements as a result of the decentration $d_x$:

$$\frac{\partial u}{\partial d_x} = \frac{\partial}{\partial d_x}M_{23} = -\frac{k}{f_1} \tag{20}$$

$$\frac{\partial u}{\partial d_x} = \frac{\partial}{\partial d_x}M_{13} = -\frac{k}{f_1}(f_0+z) = \frac{\partial u}{\partial d_x}(f_0+z) \tag{21}$$

These two equations describe the beam fanning, proportional to the decentration, of a collimated beam, as is elucidated in FIG. 3 (in which the longitudinal focal splitting can also be identified).

The detailed quantitative imaging properties of a complete afocal measurement beam path with a diffractive multi-focal lens element with internal decentration, as shown schematically by FIG. 4*b*, are disclosed by the transfer matrix of the overall system (from the object-side coherent point source to the sensor arrangement 250). If, like in FIG. 4*b*, the focal length of the object-side Fourier optical unit is denoted by f', the focal length of the refractive optical element 242 is denoted by $f_0$ and the focal length of the diffractive structure 241 is denoted by $f_1$, the following composition emerges:

$$\underline{M}(k) = \underbrace{\begin{pmatrix} 1 & f_0+z & 0 \\ 0 & 1 & 0 \\ 0 & 0 & 1 \end{pmatrix}}_{\text{Propagation from the lens element to the screen}} \tag{22}$$

$$\underbrace{\underbrace{\begin{pmatrix} 1 & 0 & -d_x \\ 0 & 1 & 0 \\ 0 & 0 & 1 \end{pmatrix}\begin{pmatrix} 1 & 0 & 0 \\ \frac{-k}{f_1} & 1 & 0 \\ 0 & 0 & 1 \end{pmatrix}\begin{pmatrix} 1 & 0 & d_x \\ 0 & 1 & 0 \\ 0 & 0 & 1 \end{pmatrix}}_{\text{Decentered diffractive lens element}}\underbrace{\begin{pmatrix} 1 & 0 & 0 \\ \frac{-1}{f_0} & 1 & 0 \\ 0 & 0 & 1 \end{pmatrix}}_{\text{Refractive lens element}}}_{\text{Effective splitting of the multi-focus lens element}} \times$$

-continued $$\ldots\ldots\times \underbrace{\begin{pmatrix} 1 & f_0 & 0 \\ 0 & 1 & 0 \\ 0 & 0 & 1 \end{pmatrix}}_{\text{Propagation from the fourier plane to the lens element}}\underbrace{\begin{pmatrix} mag & 0 & 0 \\ 0 & \frac{1}{mag} & 0 \\ 0 & 0 & 1 \end{pmatrix}}_{\text{Telescope}}$$

$$\underbrace{\begin{pmatrix} 1 & f' & 0 \\ 0 & 1 & 0 \\ 0 & 0 & 1 \end{pmatrix}\begin{pmatrix} 1 & 0 & 0 \\ \frac{-1}{f'} & 1 & 0 \\ 0 & 0 & 1 \end{pmatrix}\begin{pmatrix} 1 & f'-z' & 0 \\ 0 & 1 & 0 \\ 0 & 0 & 1 \end{pmatrix}}_{\substack{\text{Ojective lens element} \\ \text{(from the object to the Fourier plane)}}}$$

After multiplying out, the relevant transfer matrix elements are:

$$M_{11} = \frac{\partial x}{\partial x'} = f_0\frac{(f_0+z)k-f_1}{mag\ f_1 f'} \tag{23a}$$

$$M_{12} = \frac{\partial x}{\partial u'} = \frac{1}{mag\ f_0 f_1 f'}[z' f_0^2(f_1-f_0k)+ \\ \cdots\ \cdots - z(mag^2 f'^2(f_0k-f_1)-f_0^2 z'k)-mag^2 f'^2 f_0^2] \tag{23b}$$

$$M_{21} = \frac{\partial x}{\partial x'} = \frac{-1}{F} = \frac{f_0 k}{mag\ f_1 f'} \tag{23c}$$

$$M_{22} = \frac{\partial x}{\partial u'} = -mag\ f'\left(\frac{1}{f_0}+\frac{k}{f_1}\right)-\frac{f_0 z' k}{mag\ f_1 f'} \tag{23d}$$

$$\frac{M_{13}}{d_x} = \frac{\partial x}{\partial d_x} = -\frac{k}{f_1}(f_0+z) \tag{23e}$$

$$\frac{M_{23}}{d_x} = \frac{\partial x}{\partial d_x} = -\frac{k}{f_1} \tag{23f}$$

From the condition $M_{12} \overset{!}{=} 0$, the image-side longitudinal focal positions emerge as $$z_k(z_0) = \frac{-f_0^2 k + z_0(f_1+f_0k)}{f_1(f_0+z_0)k} \tag{24}$$

Here, $z_0 = Mag_0^2\ z'$ denotes the focal position of the image-side chief ray and $$Mag_0 = \frac{f_0}{mag\ f'}$$

denotes the far field imaging scale thereof. By inserting equation (24) into equations (23a)-(23f), the beam-specific imaging properties of the system are obtained in the respective focus as $$M_{11}(k; z_k(z_0)) = -Mag_0 = \frac{f_1}{f_1+f_0k+z_0k} = -Mag_k(z_0) \tag{25a}$$

$$M_{12}(k; z_k(z_0)) = 0 \tag{25b}$$

$$M_{21}(k; z_k(z_0)) = \frac{-1}{F_k} = Mag_0\frac{k}{f_1} \Longrightarrow F_k = -\frac{f_1}{Mag_0 k} \tag{25c}$$

-continued $$M_{22}(k;z_k(z_0)) = -\frac{1}{Mag_0}\frac{f_1+(f_0+z_0)k}{f_1} = \frac{f_1}{M_{11}(k;z_k(z_0))} \quad (25d)$$

The size imaging scale $Mag_k(z_0)=-M_{11}(k;z_k(z_0))$ is identical to the reciprocal angle imaging scale in accordance with $M_{22}(k;z_k(z_0))M_{11}(k;z_k(z_0))=1$ and in this case depends both on the reflection index and on the defocus $z_0$ in accordance with $$Mag_k(z_0) = Mag_0\frac{f_1}{f_1+(f_0+z_0)k} \quad (26)$$

The non-vanishing property of the term $M_{21}(k; z_k(z_0))$ corresponds to a non-vanishing refractive power (reciprocal focal length $F_k$) for the overall system and means beam-dependent telecentricity for the higher orders of diffraction.

If the relations (25a)-(25d) are inserted into the equation (5) describing the focal curve and if the value z=0 is selected for the position of the sensor arrangement 250, the following is obtained when taking into account the imaging scales in accordance with equation (26):

$$w_k=w_k(z=0)=\sqrt{w_{k,0}^2+\theta(-z_k(z_0))^2} \quad (27)$$

where $$w_{k,0} = \frac{Mag_k(z_0)}{Mag_0}w_0 \quad (28)$$

and $$\theta_k = \frac{Mag_0}{Mag_k(z_0)}\theta_0 \quad (29)$$

denote the waist sizes and the divergence angles of the used beams in relation to the chief ray and the substitution $w_0=w_{0,0}$ applies. By solving, transposing and using equation (26), the following emerges as a conditional equation for the image-side far-field parameters $\theta_0$, $w_0$ and $z_0$ $$w_k^2 = w_0^2\left(\frac{f_1}{f_1+(f_0+z_0)k}\right)^2 + \theta_0^2\left(\frac{f_0^2k-z_0(f_1-f_0k)}{f_1}\right)^2 \quad (30)$$

From this, the beam parameters are no longer determinable by a simple parabolic fit like in the case of equations (12)-(14). A possible scheme for determining the far-field parameters is obtained by rewriting the equation (30) in the style of equations (12)-(14) under the definition of the parameter ↔ pattern set $$A_1 = w_0^2 \leftrightarrow m_1(k,z_0) = \left(\frac{f_1}{f_1+(f_0+z_0)k}\right)^2 \quad (31a)$$

$$A_2 = \theta_0^2z_0^2 \leftrightarrow m_2(k) = \left(\frac{f_1-f_0k}{f_1}\right)^2 \quad (31b)$$

$$A_3 = -2\theta_0^2z_0 \leftrightarrow m_3(k) = \frac{f_0^2k}{f_1}\frac{(f_1-f_0k)}{f_1} \quad (31c)$$

-continued $$A_4 = \theta_0^2 \leftrightarrow m_4(k) = \left(\frac{f_0k}{f_1}\right)^2 \quad (31d)$$

into the form $$w_k^2=A_1m_1(k,z_0)+A_2m_2(k)+A_3m_3(k)+A_4m_4(k) \quad (32)$$

By a linear fit of the patterns $m_1(k, z_0)$, $m_2(k)$, $m_3(k)$ and $m_4(k)$ to the measured spot sizes, the parameters $A_1$ to $A_4$ are obtained, from which the far-field parameters are determined in a largely analogous manner to equation (14) by way of $$\theta_0 = \sqrt{A_4}, \quad z_0 = -\frac{A_3}{2A_4}, \quad w_0 = \sqrt{A_1}. \quad (33)$$

Solving the equations (32) is more complex than the equations (14) obtained previously for the conventional beam evaluation as a result of the explicit dependence of the pattern $m_1(k, z_0)$ on $z_0$. In accordance with one embodiment, this can be accounted for by selecting an iterative procedure as described in the following. In a first iteration step, $m_1(k, z_0)$ is replaced by $m_1(k,z_0^{(0)}=0)$ and a first estimate for $z_0^{(1)}$ is obtained by the fit in accordance with equation (28) and the calculation in accordance with equations (32). In the next step, the improved pattern $m_1(k, z_0^{(1)}=0)$ is calculated and the improved estimate $z_0^{(2)}$ is obtained. The method is continued until a termination criterion placed on the iteration is satisfied and the parameters no longer change from iteration to iteration within the scope of the admissible boundaries.

Below, possible designs of the diffractive structure 241 present in the beam-splitting optical arrangement 240 according to the invention are discussed.

In principle, the beam-splitting optical arrangement 240 can be designed in two steps, wherein the base parameters (focal length $f_0$ of the refractive optical element 242, focal length $f_1$ of the diffractive structure 241 and decentration $d_x$) are set in a first step and the specific step profile of the diffractive structure 241 is predetermined in a second step while optimizing the diffraction efficiencies for the individual sub-beams or orders of diffraction.

The following emerges from equation (23) for the longitudinal focus offset between the marginal rays with the indices $k=\pm k_{max}$ and the chief ray:

$$|z_{k_{max}}(0)-z_0(0)| = \frac{f_0^2k_{max}}{f_1\pm f_0k_{max}} \stackrel{!}{=} \kappa_1 DoF \quad (34)$$

where the depth of field range of the far field DoF should be covered to a portion $\kappa_1$ (typical value $\kappa_1=1$). The lateral split between the marginal rays and the chief ray is $$|\bar{x}_{k_{max}}-\bar{x}_0| = \frac{f_0}{f_1}k_{max}d_x \stackrel{!}{=} \kappa_2\frac{L_{sensor}}{2} \quad (35)$$

and it should comprise half the given sensor length $L_{sensor}$ to a portion $\kappa_2$ (typical value $\kappa_2=3/4$). The depth of field range is defined as $\lambda/NA^2$ for beams with a hard cutoff (e.g. top-hat beams) and as $M^2 \cdot \lambda/\pi \cdot \theta^2$ for Gaussian beams.

From the relations (34) and (35), the following design rules emerge directly for the focal length $f_1$ of the diffractive structure 241:

$$f_1 = \frac{k_{max} f_0}{\kappa_1 DoF}(f_0 \mp DoF) \underset{f_0 >> DoF}{\approx} \frac{k_{max} f_0^2}{\kappa_1 DoF} \quad (36)$$

and for the decentration $d_x$ thereof:

$$d_x = \frac{\kappa_2}{2} \frac{L_{sensor}}{k_{max}} \frac{f_1}{f_0} \quad (37)$$

By setting the two parameters $f_1$ and $d_x$, the phase function $\Phi(x, y)$ which should be realized by the diffractive structure 241 in the first order of diffraction is as follows:

$$\Phi(x, y) = \frac{2\pi}{\lambda}\left[\sqrt{(x-d_x)^2 + y^2 + f_1^2} - f_1\right] \quad (38)$$

This function emerges from the phase difference of a spherical wave emanating from the location $(d_x, 0, f_1)$ and a plane wave with a propagation vector parallel to the z-axis considered at the position z=0, where the wavelength is denoted by $\lambda$.

A suitable approximation of this phase function can be carried out by the following two operations:

Initially, the phase is brought to the uniqueness range $[0,2\pi]$ by the modulo operation in accordance with $$\Phi_{mod}(x, y) = \mathrm{mod}\left(\frac{2\pi}{\lambda}\left[\sqrt{(x-d_x)^2 + y^2 + f_1^2} - f_1\right], 2\pi\right) \quad (39)$$

Subsequently, the phase corrected thus is suitably transformed in this base range by a map U(w) with a definition range $0 \leq w \leq 1$ in accordance with $$\Phi_{DOE}(x, y) = U\left(\frac{\Phi_{mod}(x, y)}{2\pi}\right) \quad (40)$$

The function U(w) describes the complex transmission function over the unit cell, normalized to a length of one, of a regular periodic grating. The diffraction efficiencies $\eta_k = |c_k|^2$ for the orders of diffraction of such a grating, which are characterized by the index k=0, ±1, ±2, . . . , are determined by the Fourier coefficients $$c_k = \int_0^1 dx \, \exp(-2\pi i k x) U(x). \quad (41)$$

A further the design object consists of adapting the diffraction efficiencies to the measurement application by the suitable selection of the complex transmission function U(w). In order to avoid light losses, a pure phase element with $U(w)=\exp(i\phi(w))$ is considered without loss of generality below, which phase element, from a manufacturing technology point of view, can be realized by virtue of a thickness profile t(x, y) being introduced into the surface of a glass body, e.g. by etching. Here, the correspondence between thickness function phase is $$t(w) = \frac{\phi(w)}{2\pi} \frac{\lambda}{n_g - 1} \quad (42)$$

where $n_g$ denotes the refractive index of the substrate material.

The diffractive structure 241 present in the beam-splitting optical arrangement 240 according to the invention can be realized as an (e.g. binary) phase DOE. The class of binary phase DOEs (with two different phase values) which is easiest to manufacture has only one step per elemental cell. Only the phase shift $\Delta\phi$ and the step position (given by the duty factor $dc = w_{step}$) are available as design degrees of freedom. With the next higher class of binary DOEs with two levels per unit cell and the four design degrees of freedom of phase shift $\Delta\phi$, level widths $b_1$ and $b_2$, and distance $d_{12}$ between the two levels, it is possible to set an optimized profile of the orders of diffraction up to and including the third order. The phase of the electromagnetic radiation diffracted at the phase DOE corresponds to the step heights of the etched steps.

Figure 5A:
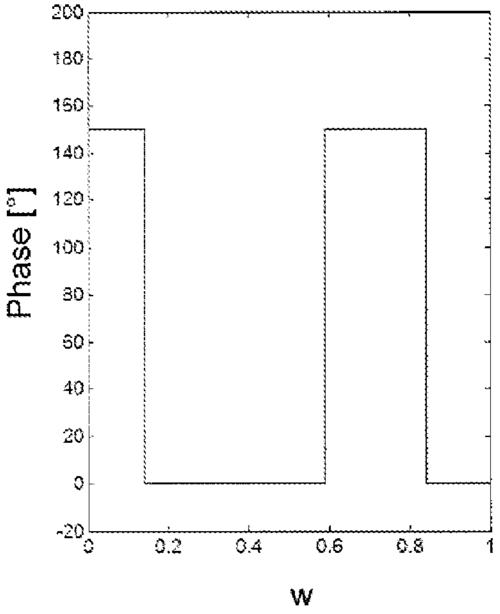
FIGS. 5A-5D show diagrams for explaining exemplary configurations of a diffractive structure present in a beam propagation camera according to the invention.
Figure 5B:
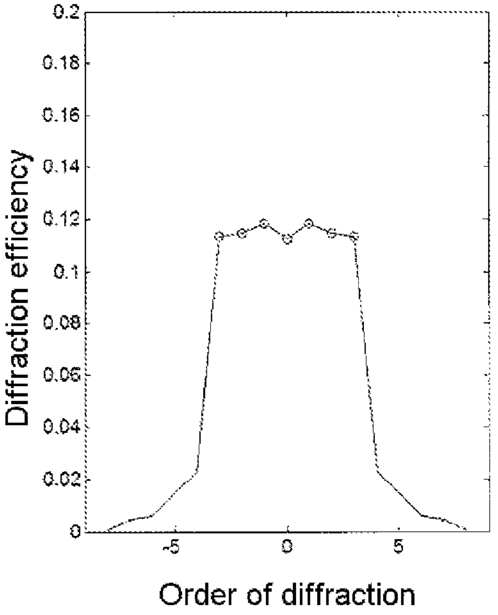

FIGS. 5A-5D depicts phase curves and the corresponding diffraction efficiencies for two different optimization objects:

In FIGS. 5A,5B, the balance (as uniform as possible) of the used orders of diffraction $-3 \leq k_{max} \leq +3$ was optimized, with FIG. 5A showing an elemental cell of the grating. As depicted in FIG. 5B, in the phase DOE depicted here, a diffraction efficiency in the range of 0.11-0.12 is obtained in each case for the used orders of diffraction, whereas the remaining (unused) orders of diffraction are loaded with little energy. In the specific exemplary embodiment, this refinement has as a consequence that approximately 80% of the energy radiated-in lies within these used orders of diffraction, when use is made of a total of seven sub-beams or used orders of diffraction (comprising the (−3)rd to (+3)rd order of diffraction), and it can be used for the measurement. In particular, the beam-spitting optical arrangement 240 according to the invention thus renders it possible to generate diffraction efficiencies enabling a highly efficient, largely uniform distribution of the energy over the used orders of diffraction using a comparatively simple DOA (diffractive optical absorber) basic design (namely a binary or two-stage phase DOE), and so this refinement is advantageous, particularly in the case of weak light conditions.

Figure 5C:
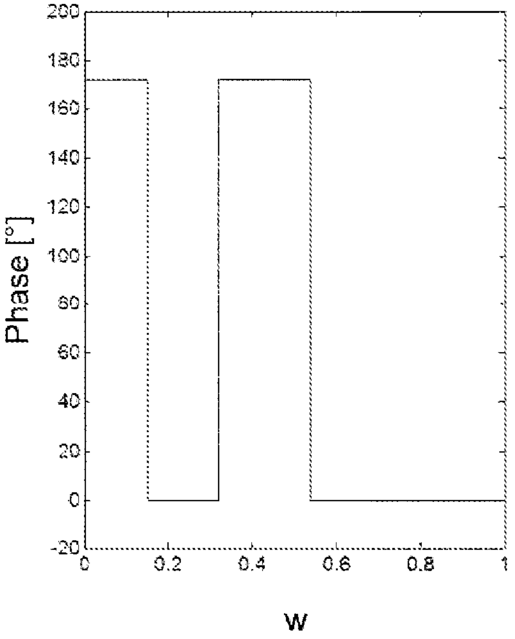
Figure 5D:
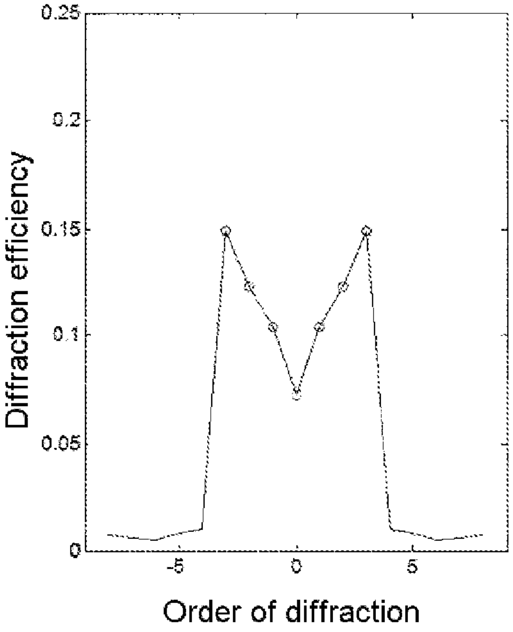

In further embodiments, as depicted in FIGS. 5C,5D, it is also possible to deviate in a targeted manner from the uniform distribution of the energy over the used orders of diffraction described above, wherein, for example in accordance with FIG. 5D, a substantially V-like curve of the diffraction efficiencies can be realized (by a corresponding grating design in accordance with FIG. 5C), in which the higher orders of diffraction are provided with more energy. As a result of this, it is possible to take account of the fact that the spots generated on the sensor arrangement 250 become wider toward the outside or with increasing distance from the ideal focal position, i.e. the corresponding regions become darker. By a curve of the diffraction efficiencies as shown in FIG. 5D, it is possible to at least partly compensate this effect of the decrease in intensity accompanying the increasing defocusing of the sub-beams generated by splitting the electromagnetic radiation to be analyzed in the sensor arrangement, as result of which the used region of the sensor arrangement can be enlarged. Therefore, an optimization was carried out in FIGS. 5C,5D in respect of an increase in the diffraction efficiencies, which is as linear as possible, with the magnitude of the order of diffraction in order to at least partly compensate the drop in intensity due to the beam widening away from the focus.

In further embodiments, instead of a phase DOE, the diffractive structure according to the invention can also be realized by a transmission DOE or an (absorbing) grayscale DOA or by any other DOE systems, e.g. multi-stage DOEs, etc.

Ultimately, a restriction of the concept according to the invention of using a diffractive structure for realizing a multi-focal beam-splitting optical arrangement or beam propagation camera is given by the restriction of the smallest achievable strip distance during the DOE production. The smallest-possible strip distance, denoted here as critical dimension cd, is the following for the embodied DOE design with two levels having the same height:

$$cd=\Delta r_{min}\min(b_1,b_2,d_{12},1-b_1-b_2-d_{12})\approx 0.1\Delta\min \quad (43)$$

Here, $$\Delta r_{min}\approx\frac{f_1\lambda}{2r_{max}}=\frac{f_1\lambda}{2(d_x+D_{aperture})} \quad (44)$$

denotes the smallest ring spacing of the zone plate with a focal length $f_1$ at the maximum used radius of the zone plate. The latter is given by $r_{max}=d_x+D_{aperture}$, where $D_{aperture}$ denotes the diameter of the aperture and $d_x$ denotes the desired decentration.

Even though the invention has been described on the basis of specific embodiments, numerous variations and alternative embodiments are evident to the person skilled in the art, e.g. through combination and/or exchange of features of individual embodiments. Accordingly, such variations and alternative embodiments are concomitantly encompassed by the present invention, and the scope of the invention is restricted only within the meaning of the appended patent claims and equivalents thereof.

What is claimed is:

1. A beam propagation camera, having an optical axis and comprising:

at least one beam-splitting optical arrangement configured to split an optical beam, which is incident on the beam-splitting optical arrangement along the optical axis, into a multiplicity of sub-beams; and a sensor arrangement configured to detect the sub-beams;

wherein the beam-splitting optical arrangement comprises a diffractive structure; and wherein the diffractive structure is configured such that at least two of the sub-beams are separated spatially from one another on the sensor arrangement and have respective foci offset from one another longitudinally along the optical axis.

2. The beam propagation camera as claimed in claim 1, wherein the diffractive structure is arranged decentered in relation to the optical axis.

3. The beam propagation camera as claimed in claim 1 wherein the beam-splitting optical arrangement further comprises a refractive optical element.

4. The beam propagation camera as claimed in claim 3, wherein the diffractive structure has a focal length $f_1$ and the refractive optical element has a focal length $f_0$, wherein the ratio $f_1/f_0$ is at least 2.

5. The beam propagation camera as claimed in claim 3, wherein the refractive optical element and the diffractive structure have a monolithic configuration.

6. The beam propagation camera as claimed in claim 3, wherein the refractive optical element is a plano-convex lens element.

7. The beam propagation camera as claimed in claim 3, wherein the refractive optical element is arranged such that a focal plane of the refractive optical element corresponds to a pupil plane in a path of the optical beam.

8. The beam propagation camera as claimed in claim 1, wherein the diffractive structure is configured as a phase diffractive optical element.

9. The beam propagation camera as claimed in claim 1, wherein the diffractive structure is configured as a transmission diffractive optical element.

10. The beam propagation camera as claimed in claim 1, wherein the diffractive structure is configured as a Fresnel lens element or as a Fresnel zone plate.

11. The beam propagation camera as claimed in claim 1, wherein the diffractive structure has an increasing diffraction efficiency with an increasing order of diffraction.

12. The beam propagation camera as claimed in claim 11, wherein a decrease in intensity accompanying an increasing defocusing of the sub-beams generated by the beam splitting on the sensor arrangement is at least partly compensated by the diffraction efficiency increasing with the increasing order of diffraction.

13. The beam propagation camera as claimed in claim 1, wherein the diffractive structure is operated in transmission.

14. The beam propagation camera as claimed in claim 1, wherein the diffractive structure is operated in reflection.

15. The beam propagation camera as claimed in claim 1, further comprising a first analysis unit configured to analyze the beam prior to reflection at an object and a second analysis unit configured to analyze the beam after reflection at the object.

16. The beam propagation camera as claimed in claim 15, wherein the object is a flying object in a laser plasma source.

17. The beam propagation camera as claimed in claim 1, further comprising an apodization filter.

18. The beam propagation camera as claimed in claim 17, wherein the sensor arrangement comprises the apodization filter.

19. The beam propagation camera as claimed in claim 17, wherein the apodization filter comprises a gray filter arranged in a pupil plane in a path of the optical beam.

20. A method for light beam analysis, comprising:

beam-splitting a beam propagating along an optical axis into a multiplicity of sub-beams;

measuring respective spot sizes generated by the sub-beams on a sensor arrangement; and calculating at least one of divergence (θ), focal position ($z_0$) and waist size ($w_0$) beam parameters from the measured spot sizes;

wherein said beam splitting comprises using a diffractive structure to spatially separate at least two of the sub-beams from one another on the sensor arrangement through a focus offset in a longitudinal direction of the optical axis.

* * * * *

UNITED STATES PATENT AND TRADEMARK OFFICE

CERTIFICATE OF CORRECTION

PATENT NO. : 11,099,400 B2
APPLICATION NO. : 15/225126
DATED : August 24, 2021
INVENTOR(S) : Matthias Manger It is certified that error appears in the above-identified patent and that said Letters Patent is hereby corrected as shown below:

On the Title Page

On the page 2, in Column 2, Item (56) under “Other Publications”, Line 7, delete “3 pages” and insert -- 6 pages --, therefor.

In the Specification

In Column 1, Line 48, delete “μn),” and insert -- μm), --, therefor.

In Column 10, Lines 42-49, delete “ $\underline{ray} = \begin{pmatrix} x \\ u \\ l \end{pmatrix}, \underline{ray'} = \begin{pmatrix} x' \\ u' \\ l \end{pmatrix}$ ” and insert -- $\underline{ray} = \begin{pmatrix} x \\ u \\ 1 \end{pmatrix}, \quad \underline{ray'} = \begin{pmatrix} x' \\ u' \\ 1 \end{pmatrix}$ --, therefor.

In Column 11, Line 7, delete “multi-focus” and insert -- multi-focal --, therefor.

In Column 11, Line 31, delete first occurrence of “$\partial$u” and insert -- $\partial$x --, therefor.

In Column 11, Line 54, delete “$\underline{\underline{M}}(k)$” and insert -- $\underline{\underline{M}}$ --, therefor.

In Column 11, Line 65, delete “multi-focus” and insert -- multi-focal --, therefor.

In Column 12, Line 8, delete “fourier” and insert -- Fourier --, therefor.

In Column 12, Line 26, delete “-” and insert -- + --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

In Column 12, Line 28, delete "$\partial x$" and insert -- $\partial u$ --, therefor.

In Column 12, Line 31, delete "$\partial x$" and insert -- $\partial u$ --, therefor.

In Column 12, Line 36, delete "$\partial x$" and insert -- $\partial u$ --, therefor.

In Column 12, Line 44, delete "$z_k(z_0) = \frac{-f_0^2 k + z_0(f_1 + f_0 k)}{f_1(f_0 + z_0)k}$" and insert -- $z_k(z_0) = \frac{-f_0^2 k + z_0(f_1 - f_0 k)}{f_1 + (f_0 + z_0)k}$ --, therefor.

In Column 12, Line 47, delete "$z_0$=$Mag_0^2$ z'" and insert -- $z_0=Mag_0^2 z'$ --, therefor.

In Column 12, Line 61, after "$-Mag_0$" delete "=".

In Column 13, Line 27, delete "+θ(" and insert -- $+\theta_k^2($ --, therefor.

In Column 14, Line 1, delete "$\left(\frac{f_0 k}{f_1}\right)^2$" and insert -- $\left(\frac{f_0^2 k}{f_1}\right)^2$ --, therefor.

In Column 15, Line 28, delete "($d_x$,0, $f_1$)" and insert -- ($d_x$,0,$f_1$) --, therefor.

In Column 17, Line 23, delete "≈0.1Δmin" and insert -- $\approx 0.1\Delta r_{min}$ --, therefor.